United States Patent
Souvatzidis et al.

(10) Patent No.: US 6,609,732 B1
(45) Date of Patent: Aug. 26, 2003

(54) QUICK CONNECT MULTI-HOSE CONNECTOR

(75) Inventors: Achille Souvatzidis, White Lake, MI (US); Henry W Harper, Milford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/061,580

(22) Filed: Feb. 1, 2002

(51) Int. Cl.⁷ .................................................. F16L 39/00
(52) U.S. Cl. ..................................................... 285/124.5
(58) Field of Search ........................... 285/124.1, 124.5, 285/124.2, 124.3

(56) References Cited

U.S. PATENT DOCUMENTS

| | | | |
|---|---|---|---|
| 4,630,847 A | 12/1986 | Blenkush | |
| 4,804,208 A | 2/1989 | Dye | |
| 5,219,185 A | 6/1993 | Oddenino | |
| 5,297,820 A | * 3/1994 | Martin | 285/137.1 |
| 5,478,119 A | 12/1995 | Dye | |
| 5,860,677 A | 1/1999 | Martins et al. | |
| 5,865,474 A | * 2/1999 | Takahashi | 285/124.1 |
| 5,984,371 A | 11/1999 | Mailleux | |
| 6,019,397 A | * 2/2000 | Baudu et al. | 285/124.1 |

OTHER PUBLICATIONS

Quick Connect fact sheet of ITT Industries, Fluid Handling Systems, Auburn Hills, MI 48326, 2 pgs. dated Oct. 11, 2000.

* cited by examiner

*Primary Examiner*—Lynne H. Browne
(74) *Attorney, Agent, or Firm*—Laura C. Hargitt

(57) ABSTRACT

A quick connect multi-hose connector includes a first carrier assembly characterized by a male housing which carries a plurality of quick connects that are trapped thereon and which are preferably free to rotate with respect thereto, and further includes a second carrier assembly characterized by a female housing which integrally carries a plurality of male configured connectors. The male housing is couplably matable with respect to female housing, wherein the male and female housings have an asymmetrical feature which allows mating to occur only in one predetermined relative orientation therebetween. A coupling feature holds the male and female housings in the mated state until a user elects to release the coupling feature.

11 Claims, 3 Drawing Sheets

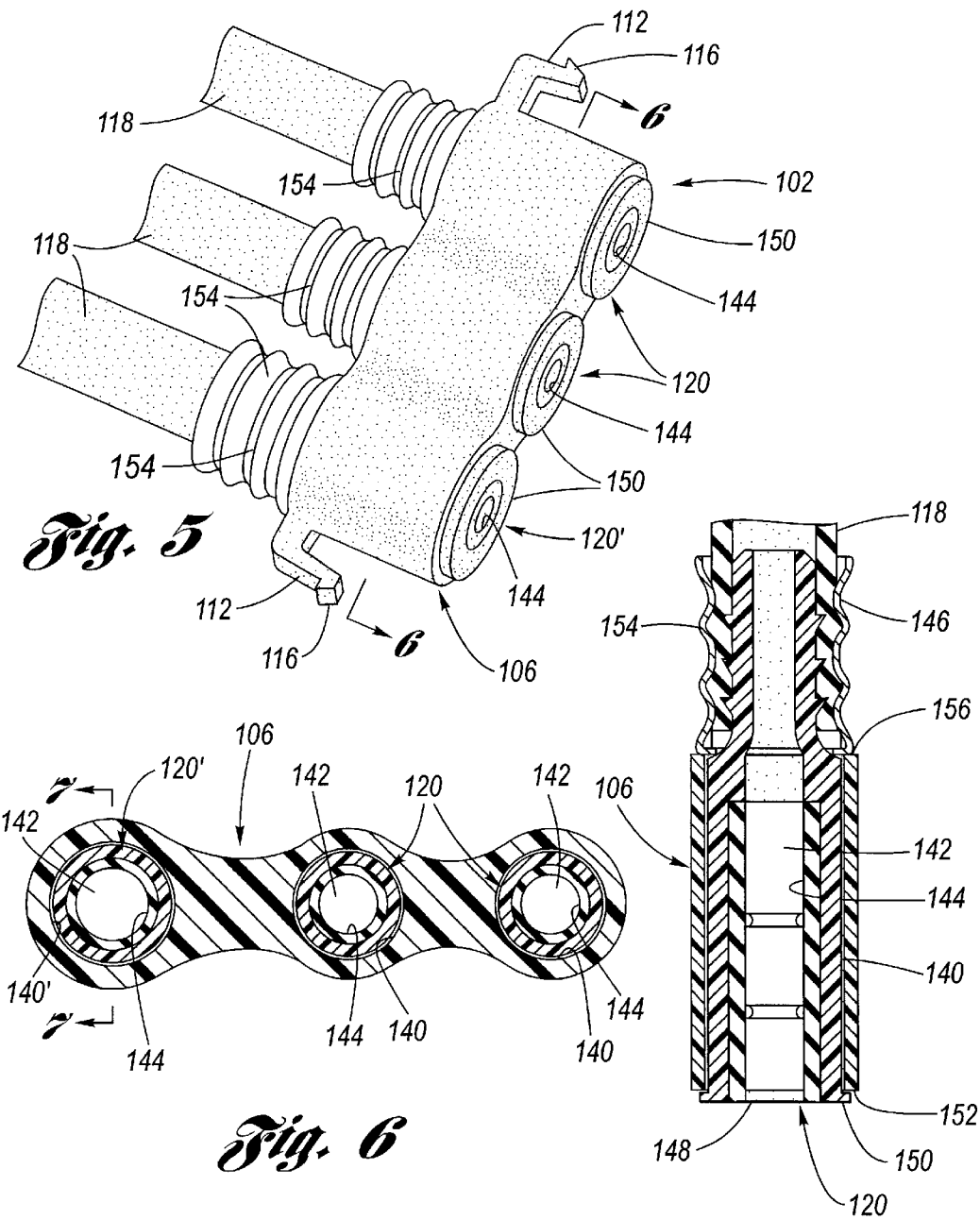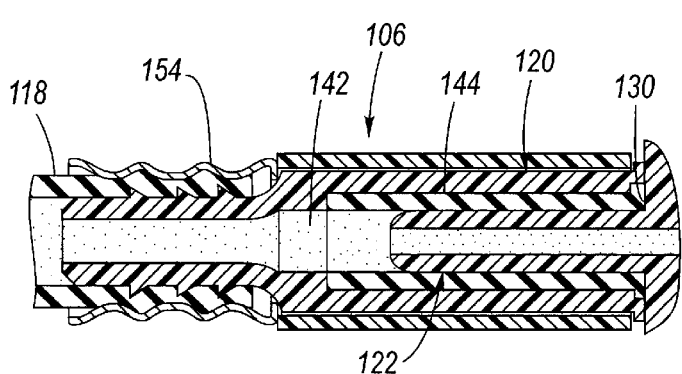

QUICK CONNECT MULTI-HOSE CONNECTOR

TECHNICAL FIELD

The present invention relates to connectors for multiple fluid hoses, as well as connectors for individual fluid hoses, referred to as "quick connects." Still more particularly, the present invention is a multi-hose connector which incorporates a plurality of quick connects.

BACKGROUND OF THE INVENTION

Fluid systems include hoses for directing fluids from one location to another, an example of which being an automotive fuel system which may include a fuel delivery hose, a pressure relief hose, and a fuel return hose. Generally, fluid systems utilize vessels and the hoses from one vessel to another vessel frequently requires hose connection interfaces therebetween.

Multi-hose connectors for the simultaneous connection of a plurality of hoses have been developed, as for example U.S. Pat. No. 4,804,208. These multi-hose connectors tend to be bulky, complex and expensive.

Individual hose-to-hose connections are most easily effected by use of a class of individual hose connectors referred to as "quick connects." FIG. 1 depicts a quick connect 10 available through ITT Industries as exemplary of this class of connectors, which are also available through a variety of sources. The quick connect 10 is a female configured connector having an internal cavity 12 which is partially defined by an elastomeric seal 14. A nipple 16 is interfaced to a fluid hose (not shown in FIG. 1), as for example by use of a crimp (also not shown in FIG. 1). A connection annulus 18 is provided opposite the nipple 16. A male configured connector 20 has a tubular extension 22 and an annular rib 24. Typically, a hose (not shown at FIG. 1) is connected to the male configured connector 20, as for example by the aforementioned nipple, which would be located opposite the tubular extension. In operation, the tubular extension 22 is pressably received into the internal cavity 12, wherein the tubular extension sealingly interfaces with the seal 14 and the rib 24 sealingly abuts an exposed end of the seal 14 via pressure exerted on the rib by a resilient member 26 of the connection annulus 18.

What remains needed in the art is to somehow combine the simplicity, ease and affordability of quick connects with multi-hose connectors.

SUMMARY OF THE INVENTION

The quick connect multi-hose connector according to the present invention includes a first carrier assembly characterized by a male housing which carries a plurality of quick connects that are trapped thereon and preferably free to rotate with respect thereto. The quick connect multi-hose connector further includes a second carrier assembly characterized by a female housing which integrally carries a plurality of male configured connectors. The male housing is couplably matable with respect to female housing, wherein the male and female housings have an asymmetrical feature which allows mating to occur only in one predetermined relative orientation therebetween. A coupling feature holds the male and female housings in the mated state until a user elects to release the coupling feature.

In an example of an environment of use, each quick connect is interfaced with a respective hose, and each male configured connector is interfaced with a fluid vessel. In operation, a user aligns the male and female housings and then presses them matingly together. Upon the coupling feature engaging, each male configured connector is simultaneously sealingly seated in its respective quick connect.

Accordingly, it is an object of the present invention to provide a multi-hose connector having quick connects incorporated therein.

This and additional objects, features and advantages of the present invention will become clearer from the following specification of a preferred embodiment.

BRIEF DESCRIPTION OF THE DRAWINGS

FIG. 5 is a perspective view of a first carrier assembly according to the present invention, shown interfaced with a plurality of fluid hoses.

FIG. 6 is a sectional view seen along line 6—6 of FIG. 5.

FIG. 7 is a sectional view seen along line 7—7 in FIG. 6.

FIG. 8 is a sectional view as in FIG. 7, shown operationally with respect to a male connector of the second carrier assembly of FIGS. 3 and 4.

DESCRIPTION OF THE PREFERRED EMBODIMENT

Figure 2:
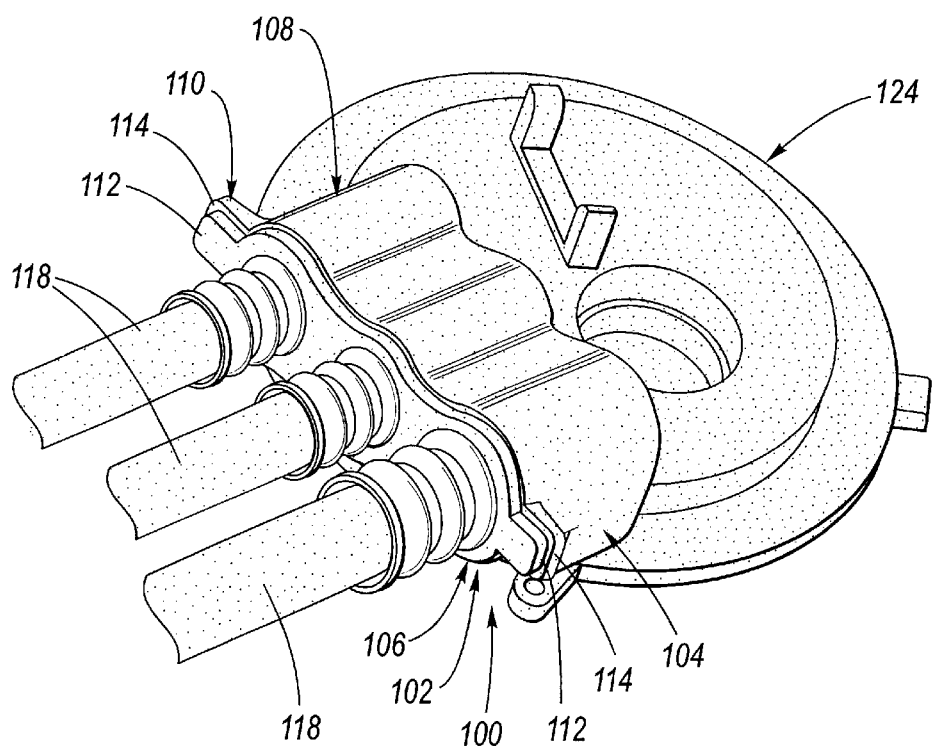
FIG. 2 is a perspective view of a quick connect multi-hose connector according to the present invention, shown interfaced with a plurality of fluid hoses and a fluid vessel component.

Referring now to the Drawing, FIGS. 2 through 8 depict various aspects of a preferred embodiment of a quick connect multi-hose connector 100 according to the present invention. As shown at FIG. 2, the quick connect multi-hose connector 100 includes a first carrier assembly 102 and a second carrier assembly 104. The first carrier assembly 102 includes a male housing 106 and the second carrier assembly 104 includes a female housing 108, wherein the male housing is shown matingly received into the female housing. The mating relationship between the male and female housings 106, 108 is retained by a coupling feature 110. A preferred coupling feature 110 is a pair of resilient barbs 112 located on opposing sides of the male housing 106 which interferingly interlock with barb receptacles 114 located on opposing sides of the female housing 108. The barbs 112 are provided with an entry ramp 116 (see FIG. 5) to facilitate entry into the barb receptacles 114. Once seated in the barb receptacles 114, the barbs retain the male and female housings 106, 108 mutually mated. Thereafter, a user may select to unmate the male and female housings by applying a mutually inward squeeze onto the barbs 112 which allows the barbs to uninterferingly pass out of the barb receptacles.

FIG. 2 depicts an example of an environment of operation of the quick connect multi-hose connector 100. The male housing 106 is interfaced with a plurality of hoses 118 via a plurality of quick connects 120 (see FIGS. 6 and 7) which are separate from, and trapped on, the male housing. The female housing 108 is integrally connected with a plurality of male configured connectors 122 (see FIGS. 3 and 4)

which are sealingly interfaced with the quick connects, and wherein the second housing 104 is integrally formed with a fluid vessel component 124 of a fluid vessel (not shown), as for example a port cover of a gas tank.

Figure 3:
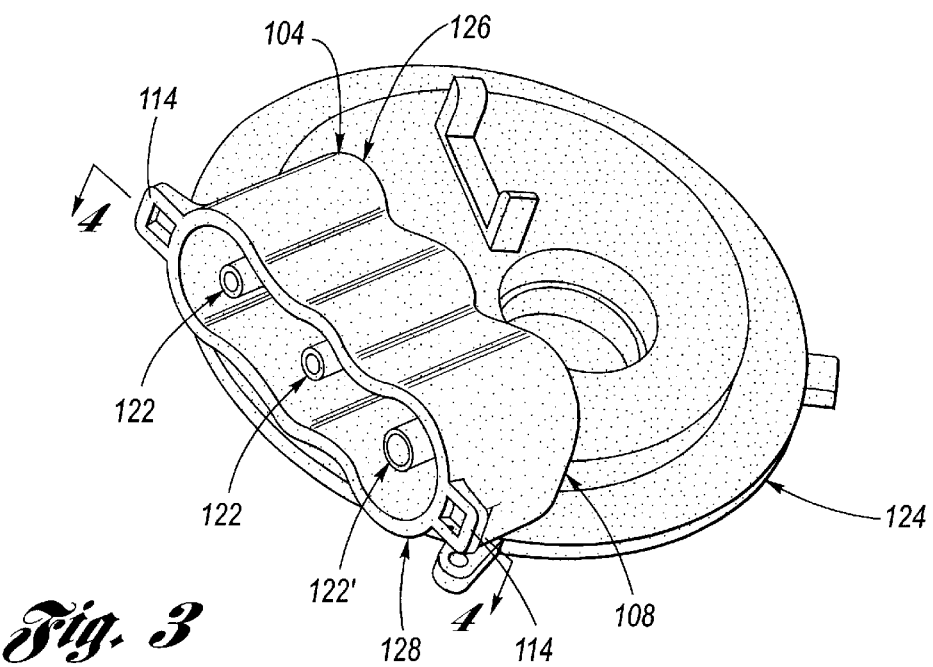
FIG. 3 is a perspective view of a second carrier assembly according to the present invention, shown interfaced with a fluid vessel component.
Figure 4:
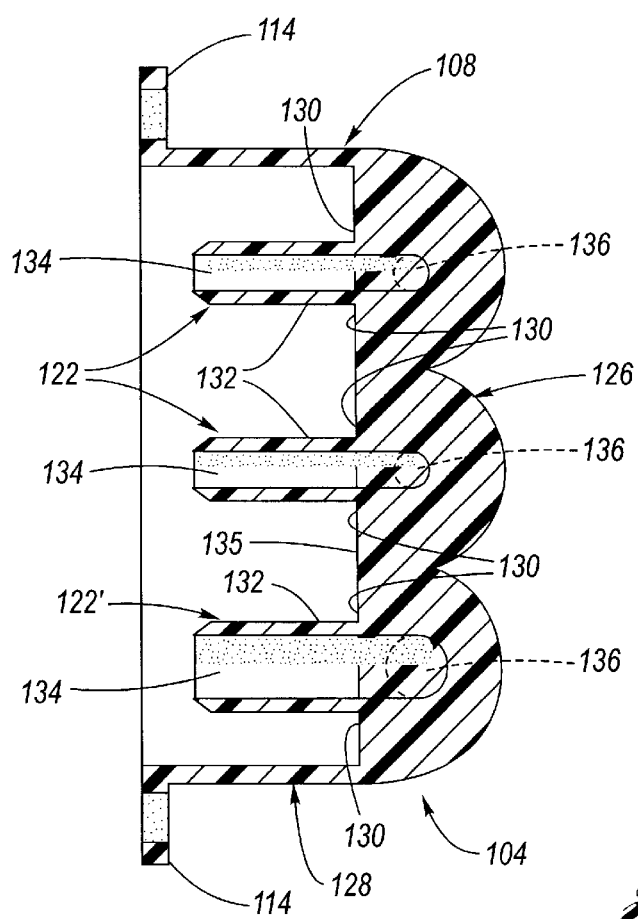
FIG. 4 is a sectional view seen along line 4—4 of FIG. 3.

Turning attention additionally now to FIGS. 3 and 4, the second carrier assembly 104 will be detailed.

The female housing 108 is preferably composed of plastic and includes a base 126 and a shroud 128 integrally connected thereto. At opposing sides of the shroud 128 are the aforementioned barb receptacles 114 of the coupling feature 110, discussed hereinabove. Within the shroud 128 is a plurality of male configured connectors 122, 122' integrally formed with the base 126 and projecting freely from a rear wall 135 of the base, both with respect to each other and with respect to the shroud. Each of the male configured connectors 122, 122' is in the form of a tube 132 which integrally connects with the rear wall 135 of the base 126. Each male configured connector 122, 122' has a passage 134 which communicates with a respective passageway 136 of the base 126 (which, in turn for example, respectively communicates with a respectively appropriate conduit of the vessel component 124).

Turning attention now to FIGS. 5 through 7, the first carrier assembly 102 will be detailed.

The male housing 106 is preferably composed of plastic and includes a plurality of through bores 140, 140' into each of which is received a respective quick connect 120, 120'. The shape of the external surfaces of the male housing are predetermined to snuggly be received into the shroud 128 of the female housing 108, and each of the through bores 140, 140' are located such as to be aligned with respect to the passages 134 of the male configured connectors 122, 122' when so received.

Figure 1:
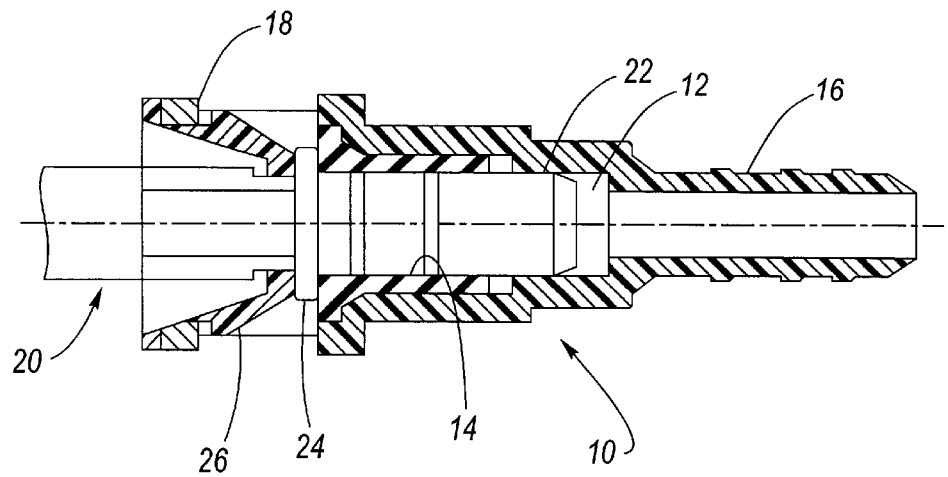
FIG. 1 is a partly sectional side view of a prior art quick connect interfaced with a prior art male configured connector.

The preferred quick connects 120, 120' are any commercially available quick connect which is suitable for the particular fluid transfer application. A general description of a quick connect is described hereinabove with respect to FIG. 1, wherein an internal cavity 142 is partly defined by an elastomeric seal 144, wherein a nipple 146 is sealingly received into a respective hose 118. However, for purposes of the present invention there is no connection annulus. The reason for obviation of the connection annulus is the operative interrelationship of the male and female housings and the connection feature 110 which substitute therefor. It will be noted that the open end 148 of the quick connect 120 has an annular flange 150 which interferingly abuts a forward end 152 of the male housing 106. Either the hoses 118 and/or a hose crimp 154 respectively located on the hoses interferingly abuts the rear end 156 of the male housing 106. Accordingly, each quick connect 120, 120' is trapped in its respective through bore 140, 140', yet is freely able to rotate relative thereto.

An asymmetrical feature of the second carrier assembly 104 with respect to its mating with the first carrier assembly 102 is provided to allow only mating when there is a predetermined proper orientation therebetween. This asymmetrical feature ensures that as multiple fluid connections made during the mating of the male and female housings, each fluid connector is correctly and assuredly aligned with its correct counterpart. Any asymmetrical feature will suffice, as for example a boss-and-slot interrelationship between the male and female housings. In the example depicted herein, the asymmetrical feature is in the form of an asymmetrical contour of the male housing 106 with respect to the shroud 128. The shroud 128 has a cross-section at a first outboard male configured connector 122' (see the right side of the shroud in FIG. 3) which is larger than the cross-section at the other outboard male configured connector 120 (see the left side of the shroud in FIG. 3). The male housing 106 has a cross-section at a first outboard quick connect 120' (see the left side of FIG. 6) that is larger than the cross-section at the other outboard quick connect 120 (see the right side of FIG. 6). Consequently, the male housing 106 can only be received into the shroud 128 when the first male configured connector 122' is aligned with the first quick connect 120'.

In operation, a user aligns the male and female housings 106, 108 and then presses them matingly together. Upon the coupling feature 110 engaging, each male configured connector 122, 122' is simultaneously sealingly seated in its respective quick connect 120, 120'. In this regard, FIG. 8 depicts a view as in FIG. 7 now including a male configured connector 122, wherein the male and female housings 106, 108 are mutually mated. It is to be noted that the coupling feature 110 maintains a pressing force of the respective local area 130 of the rear wall 135 against the seals 144 of their corresponding quick connects.

It is to be understood that the quick connect multi-hose connector 100 simultaneously connects fluid hoses which may carry either a liquid or a gas. Benefits of the present invention, include: reduction of manufacturing/assembly time; reduction of fluid system complexity; increase of fluid system reliability and safety (fewer locales of hose connections), and increases fluid system quality (elimination of incorrect hose connections). The asymmetrical feature assures prevention of incorrect connection, and the self alignment of the connectors internal to the male and female housings compensates for individual tolerances. The short connection engagement distance reduces part length and fluid system complexity.

The latching of the coupling feature 110 assures accidental disconnection cannot happen, and further serves as a visual/audible indicator of a fully mated state between the male and female connectors 106, 108. Optionally, a secondary connection assurance device may supplement the coupling feature 110. For example a hole may be formed in each of the shroud of the female housing and male housing (as for example somewhere in the space between the through bores), which holes align upon actuation of the coupling feature, and through each of which a retaining pin is (for example snappingly) placed.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A multi-hose connector comprising:
 a first carrier assembly comprising:
  a male housing having a plurality of through bores formed therein; and
  a plurality of quick connects each received in one of said through bores of said male housing;
 a second carrier assembly comprising:
  a female housing axially matable with respect to said male housing such that said male housing is snuggly received within said female housing; and
  a plurality of male configured connectors connected to said female housing, each said male configured connector being simultaneously sealingly received by a respective said quick connect when said male and female housings are mutually axially mated; and a coupling feature located at each of said male and female housings, said coupling feature selectively retaining said male and female housings mutually axially mated.

2. The multi-hose connector of claim 1, wherein each said quick connect is trapped in its respective through bore, and wherein each said quick connect is freely rotatable with respect to its through bore.

3. The multi-hose connector of claim 2, wherein each said quick connect has an internal cavity at least partly defined by a seal; wherein each said male configured connector comprises a tube extending from a rear wall of the female housing, wherein a passage passes through said tube, and wherein the tube and the rear wall are sealingly interfaced with said seal when said male and female housings are mated.

4. The multi-hose connector of claim 3, wherein said female housing comprises a base and a shroud integrally connected therewith; said plurality of male connectors being integrally connected to the rear wall at said base.

5. The multi-hose connector of claim 4, wherein said base has a plurality of passageways selectively communicating with the passages of said plurality of male configured connectors.

6. The multi-hose connector of claim 5, further comprising an asymmetrical feature associated with each of said first and second carrier assemblies which permits the mating of said male and female housings only in a single predetermined orientation therebetween.

7. A multi-hose connector comprising:

a first carrier assembly comprising:
   a male housing having a plurality of through bores formed therein; and
   a plurality of quick connects each received in one of said through bores of said male housing;

a second carrier assembly comprising:
   a female housing axially matable with respect to said male housing such that said male housing is snuggly received within said female housing; and
   a plurality of male configured connectors connected to said female housing, each said male configured connector being simultaneously sealingly received by a respective said quick connect when said male and female housings are mutually axially mated;

a coupling feature located at each of said male and female housings, said coupling feature selectively retaining said male and female housings mutually and axially mated; and an asymmetrical feature associated with each of said first and second carrier assemblies which permits the mating of said male and female housings only in a single predetermined axial orientation therebetween.

8. The multi-hose connector of claim 7, wherein each said quick connect is trapped in its respective through bore, and wherein each said quick connect is freely rotatable with respect to its through bore.

9. The multi-hose connector of claim 8, wherein each said quick connect has an internal cavity at least partly defined by a seal; wherein each said male configured connector comprises a tube extending from a rear wall of the female housing, wherein a passage passes through said tube, and wherein the tube and the rear wall sealingly interfaced with said seal when said male and female housings are mated.

10. The multi-hose connector of claim 9, wherein said female housing comprises a base and a shroud integrally connected therewith; said plurality of male connectors being integrally connected to the rear wall at said base.

11. The multi-hose connector of claim 10, wherein said base has a plurality of passageways selectively communicating with the passages of said plurality of male configured connectors.

* * * * *